(12) United States Patent
Endo

(10) Patent No.: US 6,352,186 B1
(45) Date of Patent: Mar. 5, 2002

(54) CELLULAR PHONES

(75) Inventor: Tomohiro Endo, Osaka (JP)

(73) Assignee: Shic Co., Ltd., Osaka (JP)

( * ) Notice: Subject to any disclaimer, the term of this patent is extended or adjusted under 35 U.S.C. 154(b) by 0 days.

(21) Appl. No.: 09/433,459

(22) Filed: Nov. 4, 1999

(30) Foreign Application Priority Data

Apr. 23, 1999 (JP) .......................................... 11-115980

(51) Int. Cl.[7] ................................................. A45F 3/14
(52) U.S. Cl. ...................... 224/254; 224/255; 224/645; 224/930; 455/90
(58) Field of Search ................................ 224/254, 255, 224/667, 578, 920, 929, 645; 150/107, 108; 190/115, 116, 117; D14/142, 147; 294/168, 171, 167; 24/3.11, 3.12; 446/141; 455/90

(56) References Cited

U.S. PATENT DOCUMENTS

| | | | | | |
|---|---|---|---|---|---|
| 3,085,610 | A | * | 4/1963 | Vardan | 150/107 X |
| 5,042,704 | A | * | 8/1991 | Izzo | 224/645 X |
| D379,262 | S | * | 5/1997 | Seigel | D3/218 |
| 5,709,012 | A | * | 1/1998 | Ebashi | 224/667 X |
| 6,052,868 | A | * | 4/2000 | Chen | 294/137 X |

* cited by examiner

Primary Examiner—Stephen K. Cronin
Assistant Examiner—Maerena W. Brevard
(74) Attorney, Agent, or Firm—Richard M. Goldberg

(57) ABSTRACT

An improved cellular phone has a longitudinal slit 11 cut in an outer case or cover of a cellular phone or a longitudinal pole 12 provided thereon. One end of a strap having a clipping device attached to the other end thereof is movably fitted in said slit or connected to said pole. The improved cellular phone permits its user to transmit and receive messages while keeping the cellular phone anchored to a pocket or other part of a persons clothes.

14 Claims, 2 Drawing Sheets

CELLULAR PHONES

BACKGROUND OF THE INVENTION

This invention relates to improvements in strapping means to secure a cellular phone.

A cellular phone is a mobile radiotelephone featuring, as its name implies, free mobility. Generally, a cellular phone is anchored or attached to a pocket or other part of the clothes of its user by means of a strap having a clasping device generally, at a first end thereof, with a second end thereof fastened to or near the upper end of the cellular phone where the receiving unit is situated.

The reason why the second end of the strap is attached to the upper end of the cellular phone is to keep the antenna of the cellular phone, which is situated at the same end as the receiving unit, from hanging down when the cellular phone is attached by means of the strap.

With one end of the strap fastened to the receiver end and the other end to a pocket or other part of the clothes, however, the length of the strap ordinarily is not long enough to permit bringing the transmitter end of the cellular phone near to the mouth of the user while. holding the receiver end besides the ear.

It might seem that the above problem can be solved by making the strap long enough. Actually, however, a long strap tends to fill the pocket, become tangled and, thus, reduces the ease of using the cellular phone. When outside the pocket, the cellular phone would hang down to a point beside the lower half of the body because of the long strap.

SUMMARY OF THE INVENTION

In order to solve the aforementioned problem, this invention provides:

(1) An improved cellular phone that comprises an outer case accommodating a cellular phone or a cover placed over the outer case having a longitudinal slit along with a first end of a strap having a clipping device at a second end thereof which is movable; and (2) An improved cellular phone that comprises an outer case accommodating a cellular phone or a cover placed over the outer case having a longitudinal pole consisting of a wire or rod along which a first end of a strap having a clipping device at a second end thereof is movable.

DETAILED DESCRIPTION OF THE INVENTION

Figure 1:
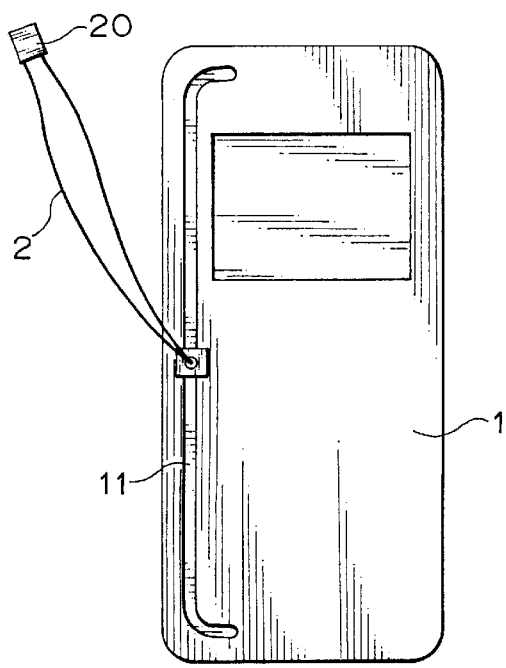
FIG. 1 shows the basic structure of an improved cellular phone (1); (a) is a plan view and (b) is a partial cross-sectional top view.
Figure 1:
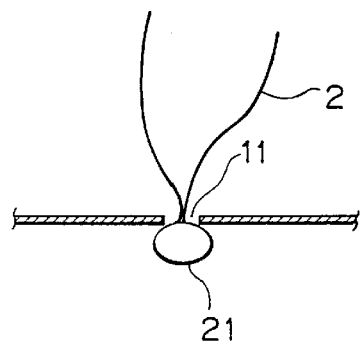

The structure (1) features a slit 11 extending longitudinally along the length of a case or a cover 1 of a cellular phone from the receiver end to the transmitter end thereof, with one end of a strap inserted in the slit 11 so as to be movable therealong, as shown in FIGS. 1(a) and (b).

Figure 2:
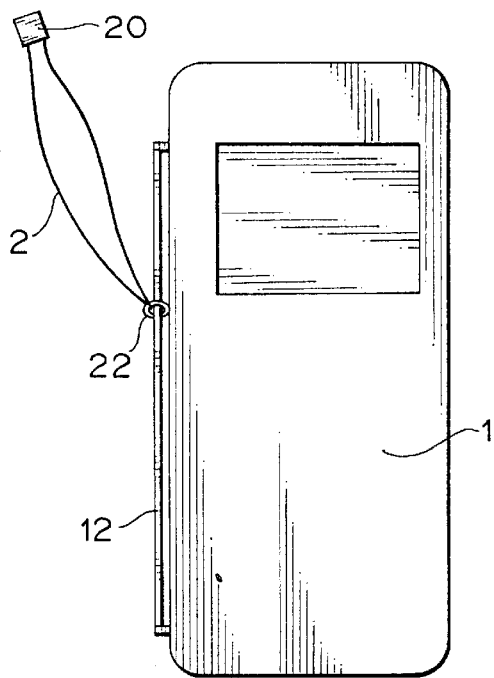
FIG. 2 shows the structure of an improved cellular phone (2); (a) is a plan view and (b) is a partial cross-sectional top view.
Figure 2:
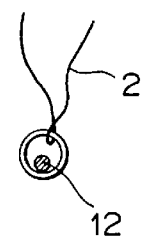

The structure (2) basically features a pole consisting or a rod or a wire attached to a case or a cover of a cellular phone, with one end of a strap connected thereto so as to be movable therealong, as shown in FIGS. 2(a) and (b).

The essential feature of both structures (1) and (2) is that one end of the strap is movable, as described above.

One end of the strap of the structure (1) is connected to the slit by means of a knob 21 as shown in FIG. 1(b), whereas one end of the strap of the structure (2) is connected to the pole 12 consisting of a wire or rod by means of a ring 22 formed by the strap itself or attached thereto as shown in FIG. 2(b). The other end of strap 2 is connected to a clipping device 20.

Figure 3:
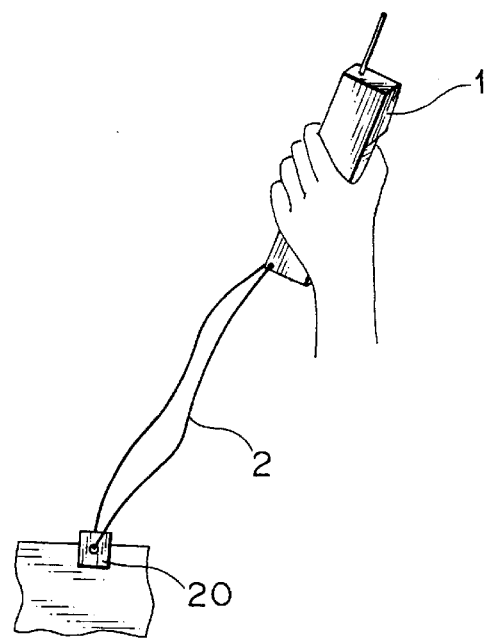
FIG. 3 is a view showing how a cellular phone according to this invention is used.

The strap 2 of both structures (1) and (2) is movable longitudinally along the length. of a cellular phone. When the cellular phone is taken out of a pocket to which one end of the strap is anchored, the other end of the strap can be moved to the transmitter end of the cellular phone so that the user can transmit and receive messages while keeping the cellular phone connected to a pocket, as shown in FIG. 3.

Embodiments

Figure 4:
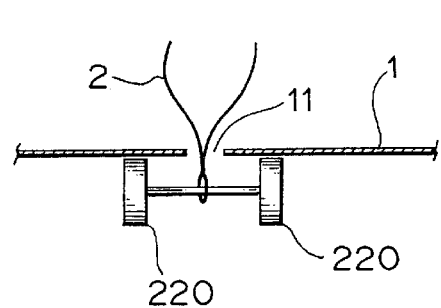
FIG. 4 is a partial cross-sectional top view showing the structure of a first embodiment of this invention; (a) is a structure having rotatable wheels and (b) is a structure having rotatable balls.
Figure 4:
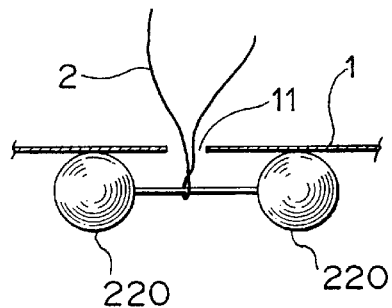
Figure 5:
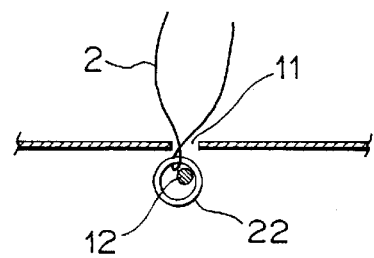
FIG. 5 is a partial cross-sectional top view showing the structure of a second embodiment of this invention.

A first embodiment of the structure (1) has a strap whose one end moves smoothly along the slit by means of rotatable wheels or balls 220 pivotally provided thereat, as shown in FIGS. 4(a) and (b).

The rotatable wheels or balls rotate in contact with the inner surface of the case or cover, thereby permitting a smooth longitudinal motion of the strap while eliminating frictional resistance between the strap and the slit 11.

A second embodiment of the structure (2) has a rod 12 disposed inside the case and a slit extending along the rod 12 cut in the case so that one end of the strap is connected to the rod 12.

The second embodiment is similar to the structure (1) in that it has a slit but differs therefrom in that an end of the strap is connected to the rod 12.

Provision of the pole 12 inside the case keeps the pole 12 from coming off and removing the unsightly protrusion of the pole 12 on the outside.

The cellular phones of this invention described above permit transmitting and receiving messages while they are connected to a pocket or other clothing, thus offering greater simplicity and convenience in use than the conventional phones.

The cellular phones according to this invention having the structures (1) and (2) described above have outstanding worth and merit.

What is claimed is:

1. A cellular phone comprising:
   an outer case having a top edge, a bottom edge and a longitudinal strap guide extending for a majority of a length of said outer case between said top edge and said bottom edge,
   a strap having a first end and a second end, said first end retained by said longitudinal strap guide for movement between an upper end of said longitudinal strap guide and a lower end of said longitudinal strap guide, and
   a securing arrangement provided at said second end of said strap.

2. A cellular phone according to claim 1, wherein said longitudinal strap guide extends for a length almost equal to an entire length of said outer case between said top edge and said bottom edge.

3. A cellular phone according to claim 1, wherein said securing arrangement includes a clipping device secured to the second end of said strap.

4. A cellular phone comprising:

an outer case having a top edge, a bottom edge and a longitudinal slit extending for a majority of a length of said outer case between said top edge and said bottom edge, a strap having a first end and a second end, said first end moveably retained in said longitudinal slit for movement between an upper end of said longitudinal slit and a lower end of said longitudinal slit, and a securing arrangement provided at said second end of said strap.

5. A cellular phone according to claim 4, further comprising at least one rotatable wheel secured to said first end of said strap and retained within said slit in rolling contact with an inner wall of said case to permit said first end of said strap to move between the upper end of said slit and the lower end of said slit.

6. A cellular phone according to claim 4, further comprising at least one rotatable ball secured to said first end of said strap and retained within said slit in rolling contact with an inner wall of said case to permit said first end of said strap to move between the upper end of said slit and the lower end of said slit.

7. A cellular phone according to claim 4, wherein said longitudinal slit extends for a length almost equal to an entire length of said outer case between said top edge and said bottom edge.

8. A cellular phone according to claim 4, wherein said securing arrangement includes a clipping device secured to the second end of said strap.

9. A cellular phone comprising:

an outer case having a top edge, a bottom edge and a longitudinal pole secured to said case and extending for a majority of a length of said outer case between said top edge and said bottom edge, a strap having a first end and a second end, said first end moveably retained by said longitudinal pole for movement between an upper end of said longitudinal pole and a lower end of said longitudinal pole, and a securing arrangement provided at said second end of said strap.

10. A cellular phone according to claim 9, further comprising a ring secured to said first end of said strap, said ring positioned around said pole for movement between the upper end of said longitudinal pole and the lower end of said longitudinal pole.

11. A cellular phone according to claim 9, wherein said longitudinal pole is fixed to an outer surface of said case.

12. A cellular phone according to claim 9, wherein said longitudinal pole is positioned within said case, and said case includes a slit through which said first end of said strap extends for moveable retention by said pole.

13. A cellular phone according to claim 9, wherein said pole extends for a length almost equal to an entire length of said outer case between said top edge and said bottom edge.

14. A cellular phone according to claim 9, wherein said securing arrangement includes a clipping device secured to the second end of said strap.

* * * * *